3,065,234
PREPARATION OF 1-(β-HYDROXYPROPYL)-
THEOBROMINE
Karl Heinz Klingler, Langen, Hesse, Germany, assignor to Chemiewerk Homburg, Zweigniederlassung der Deutschen Gold- und Silber-Scheideanstalt, vorm. Roessler (Degussa), Frankfurt am Main, Germany, a German corporation
No Drawing. Filed May 5, 1959, Ser. No. 810,987
Claims priority, application Germany Aug. 23, 1955
1 Claim. (Cl. 260—256)

This invention relates to new and useful improvements in the production of 1-(β-hydroxypropyl)-theobromine and to novel injection solutions containing the same and is a continuation-in-part of United States patent application Serial Number 604,078, filed August 15, 1956.

C. A. Rojahn and H. Fegeler in Arch. Pharm. 268, 570 (1930) describe the preparation of a compound from theobromine sodium or theobromine silver and β-chloropropanol. This compound had a melting point of 129° C. and was designated as 1-(β-hydroxypropyl)-theobromine. The yields obtained, when proceeding in accordance with this method, however, only amount to 1–2% of the theoretical yield, and can only be increased to a maximum of about 5% of the theoretical yield by operating in a xylene suspension under pressure. Due to the recovery of these low yields, the process has no technical importance.

One object of this invention is a technically and commercially feasible process for producing high yields of 1-(β-hydroxypropyl)-theobromine. Another object of this invention is the preparation of a substantially pure 1-(β-hydroxypropyl)-theobromine product.

Still another object of the invention is the preparation of highly stable, therapeutically calibrated injection solutions containing the substantially pure 1-(β-hydroxypropyl)-theobromine. This and still further objects will become apparent from the following description:

In accordance with the invention, it has now been found that high yields of 1-(β-hydroxypropyl)-theobromine may by obtained by contacting the readily available 1-allyl-theobromine with water in the presence of a water addition catalyst, such as phosphoric acid, boron trifluoride and preferably sulfuric acid. The contacting results in an addition of water to the double bond of the allyl group resulting in the formation of 1-(β-hydroxypropyl)-theobromine, which may be recovered in yields of 90–95% of the theoretical yield.

The product obtained melts at 138–142° C., which is 13° higher than the material described by Rojahn and Fegeler. While the product obtained by the process in accordance with the invention is substantially pure 1-(β-hydroxypropyl)-theobromine, the Rojahn and Fegeler product is actually a mixture which, in addition to 1-(β-hydroxypropyl)-theobromine, contains unreacted theobromine, etc. The purity of the 1-(β-hydroxypropyl)-theobromine is of the greatest importance with respect to the use of the same for the preparation of injection solutions containing 1-(β-hydroxypropyl)-theobromine. It has been established by considerable experimental testing that injection solutions which are prepared from a product consisting of 2.5% theobromine and 97.5% 1-(β-hydroxypropyl)-theobromine are unstable, the theobromine rapidly separating out at temperatures of about 20° C., rendering the same totally unsuitable for purposes of injection and further making it impossible to accurately therapeutically calibrate the solutions. In this connection it should be pointed out that it is well known that purification by crystallization of a theobromine-containing mixture is very difficult. The purification operations result in heavy losses in the desired product and are more difficult to effect than the actual synthesis itself.

In preparing the solutions of 1-(β-hydroxypropyl)-theobromine, the 1-(β-hydroxypropyl)-theobromine is dissolved in water and the resulting solution heated. Preferably pre-warmed water is used to dissolve the 1-(β-hydroxypropyl)-theobromine. When the solution, prepared from the 1-(β-hydroxypropyl)-theobromine obtained by reacting theobromine sodium or theobromine silver and β-chloropropanol, i.e. the product described by Rojahn and Fegeler, is cooled, the same after a while takes on a cloudy and turbid appearance. This is the result of the theobromine contained in the preparation settling out.

It has been established that 1-(β-hydroxypropyl)-theobromine, which is in admixture with theobromine in amounts of about 2.5% of theobromine, can not be utilized to prepare stable, clear solutions. Thus, for example, a 30% solution of 1-(β-hydroxypropyl)-theobromine having a content of 2.64% theobromine evidences instability, the theobromine rapidly separating out at temperatures of about 20° C. It is only in very dilute solutions of the known 1-(β-hydroxypropyl)-theobromine that there is no separation of theobromine. In this regard it has been established that only in solutions of 1% does the product of Rojahn and Fegeler result in a clear, stable solution of 1-(β-hydroxypropyl)-theobromine.

This makes apparent an additional advantage of the product prepared in accordance with the invention, namely that the use thereof permits for the first time stable solutions of 1-(β-hydroxypropyl)-theobromine containing up to 40% of the 1-(β-hydroxypropyl)-theobromine.

The process of the invention can be carried out by contacting the 1-allyl-theobromine with water in the presence of the water addition catalyst at a temperature of from room to 160° C. When the catalyst used is either phosphoric acid or boron trifluoride, it has been found preferable to use temperatures of from about 100 to 160° C., temperatures of from 120–160° C. being most advantageous in the instance of the boron trifluoride catalyst. When sulfuric acid is employed, the lower temperatures are indicated.

It has been found preferable, in order to obtain good yields and the product of highest purity when sulfuric acid is used as the catalyst, to control the temperature in stages during the reaction. In the first stage it is desirable to cool the reaction mixture to temperatures below 30° C. and thereafter to heat the reaction mixture in a second stage to temperatures between about 50–80° C. The heating is most preferably effected so that the second state is subdivided by first heating to a temperature between about 50–65° C. and thereafter increasing the temperature to between 75–80° C.

After reaching the maximum temperature, the reaction mixture is cooled, diluted in several times its quantity of water and boiled under a reflux condenser. After the mixture has again been cooled, it is neutralized with a caustic soda solution which results in the separating out of the 1-(β-hydroxypropyl)-theobromine in the form of an oil which solidifies upon cooling. The solid cooled product is separated from the saturated sodium sulfate or sodium phosphate solution, dried and recrystallized from isopropyl alcohol.

The 1-(β-hydroxypropyl)-theobromine formed is readily soluble in water and constitutes a valuable pharmaceutical product constituting a diuretic of high activity and additionally having excellent anti-asthmatic properties. The injection solutions of the invention are therapeutically applicable in the management of coronary insufficiency, cardiac infarct, tachycardial rhythm disturbances and peripheral blood flow disturbances.

The highest stability in solution obtainable with the 1-(β-hydroxypropyl)-theobromine product described by Rojahn and Fegeler is very poor, for the reasons already set forth. In accordance with the invention, however, solutions having a concentration of up to 40% of the substantially pure 1-(β-hydroxypropyl)-theobromine are possible. The therapeutically important injection solutions have a concentration within the range of 15–40% and preferably a concentration of 30% of the 1-(β-hydroxypropyl)-theobromine. The solutions may be administered intravenously, intramuscularly or subcutaneously.

The 1-(β-hydroxypropyl)-theobromine formed in accordance with the invention may also be compounded in the form of tablets and drops. The use therein of the 1-(β-hydroxypropyl)-theobromine, melting at 138–142° C., results in a pharmacal of highly stable nature capable of being accurately calibrated and one which is well-tolerated by the recipient.

The following examples are given by way of illustration and not limitation:

*Example 1*

30 grams 1-allyl-theobromine are dissolved by stirring with 30 cc. of concentrated sulfuric acid. Heat is given off by this reaction, and there is obtained a light-brown slurry which is allowed to cool to room temperature. The slurry is then heated over the course of an hour, with further agitation to 70–80° C. The reaction mixture is stirred into 300 cc. of water and the solution obtained boiled for two hours under a reflux condenser. After cooling it is neutralized with caustic soda solution, the small amount of brown resins is filtered off, and it is evaporated in a vacuum to dryness. The residue is boiled with isopropyl alcohol and the isopropanol solution is filtered while hot and concentrated to a small volume. The slurry of crystals thus obtained is suction-filtered after cooling and washed with a small amount of acetone. There are obtained 26 grams 1-(β-hydroxypropyl)-theobromine having a melting point of 138–139° C.

Substantially the same results are obtained if phosphoric acid or borontrifluoride is employed as water addition catalyst in place of the sulfuric acid.

*Example 2*

4 kg. allyl-theobromine are introduced with stirring into 4 liters of cooled concentrated sulfuric acid, the temperature not being permitted to rise above 30° C. Thereupon the thoroughly stirred mixture is heated on a water bath and the temperature is maintained for about 30 muintes at 50–65° C. Within a further 50 minutes it is heated further to 75–80° C. and then cooled off. The solution having a temperature of about 60° C. is then poured into 18 liters of water and boiled for 2 to 3 hours. After cooling to room temperature it is neutralized with concentrated caustic soda solution, the hydroxypropyl theobromine separating out in the form of an oil. The crude product, which solidifies upon cooling, is separated from the saturated sodium solution, dried and recrystallized from isopropyl alcohol. In this way there are obtained 3.75 kg. 1-(β-hydroxypropyl)-theobromine. After the isopropanol mother liquor has been worked up, the yield is 94–95%. The substance melts at 140–142° C.

*Example 3*

10 g. borontrifluoride are passed into 5.3 cc. of water and 10 g. allyl-theobromine introduced with stirring into this solution. Thereupon, after 2 hours, the thoroughly stirred mixture is heated on a water bath to 120° C. and the temperature is maintained for about 45 minutes and then cooled off. After cooling, the reaction product is diluted with 50 cc. water and boiled for 2 hours. After cooling to room temperature, the solution is neutralized with caustic soda solution and the neutral solution extracted by shaking with chloroform. The chloroform is distilled off and the 1-(β-hydroxypropyl)-theobromine remaining is recrystallized from isopropyl alcohol. The yield of 1-(β-hydroxypropyl)-theobromine amounted to 9 g. The substance melts at 138–141° C.

The procedure was repeated, substituting for the borontrifluoride catalyst phosphoric acid. Substantially similar results were obtained.

*Example 4*

10 liters of aqueous solution of 1-(β-hydroxypropyl)-theobromine suitable for purposes of injection were prepared in the following manner:

3,000 kilos of 1-(β-hydroxypropyl)-theobromine were dissolved in 6 liters of warm (50° C.) twice-distilled water. The solution's pH was then adjusted with 2 N KOH to a single pH value within the range of 5.8–6.5. 5.0 grams of charcoal (Carbo Med. DAB 6) were then added and the solution stirred. The solution was then presterilized in cotton-stopper glass flasks by heating at 100° C. for 30 minutes. After 4 days the solution was brought to a volume of 10 liters, filtered, employing Schleicher & Schuell No. 598½ folded filters, whereby the charcoal was removed and the solution then passed through Seitz filters having EKS layers and on the same day filled into 1 cc. ampoules. The ampoules were sterilized for 30 minutes at 100° C. Each 1 cc. ampoule contained 0.300 g. of 1-(β-hydroxypropyl)-theobromine.

The following clinical data were obtained, employing as test compound 1-(β-hydroxypropyl)-theobromine prepared in accordance with the invention:

The effect of 1-(β-hydroxypropyl)-theobromine on the circulatory system of healthy humans was determined by following the methods set out by Wezler-Böger (Erg. Physiol. 41, 292 (1939), Erg. Physiol., Biol. Chem. Exp. Pharmakol. 41 476 (1939)). In this connection, there were taken into account the systolic and diastolic blood pressure, pulse frequency, the pulse curve of the arteria carotis and the arteria femoralis. From the above there could be derived the average blood pressure, the blood pressure amplitude, beat and minute volume of the heart, the peripheral vascular resistance and the elastic resistance of the aorta.

The following results represent the average values obtained in 23 healthy human subjects who had received 0.26 g. 1-(β-hydroxypropyl)-theobromine intravenously. The determinations were made within 5 minutes of the injection and accordingly represent acute responses to 1-(β-hydroxypropyl)-theobromine.

| Results: | Percent |
|---|---|
| Systolic blood pressure | +5 |
| Diastolic blood pressure | +10 |
| Blood pressure amplitude | +25 |
| Beat volume | +24 |
| Volume per minute | +33 |
| Pulse frequency | +11 |
| Peripheral vascular resistance | −38 |
| Elastic resistance of aorta | +5 |

The same analyses were determined but in this instance 12 subjects suffering from hypertension and circulatory decompensation were evaluated. The determinations were all made within 15 minutes of the intravenous injection of 0.26 g. 1-(β-hydroxypropyl)-theobromine and are classed as acute responses.

| Results: | Percent |
|---|---|
| Blood pressure amplitude | +5 |
| Beat volume | +5 |
| Volume per minute | +7 |
| Pulse frequency | +2 |
| Peripheral vascular resistance | −5 |
| Elastic resistance of aorta | −5 |

The following are results, clinically observed in subjects to whom 1-(β-hydroxypropyl)-theobromine prepared in accordance with the invention had been administered. The subjects were followed and checked by the following clinical routine procedures: blood pressure, pulse frequency, electrocardiograph and evaluation of the diuresis produced. In each instance 0.3 g. 1-(β-hydroxypropyl)-theobromine was intravenously administered:

(1) *Blood pressure.*—The determinations were carried out and appraised according to the procedure established by Riva-Rocci and Korotkoff. In 20 patients afflicted with cardiac and coronary insufficiency only slight fluctuations within the limit of error were noted. In 40 cases of hypertension no measurable effect on the blood pressure level could be determined.

(2) *Pulse frequency.*—The same group of subjects was observed for changes in pulse rate. In no instance could any significant change be detected.

(3) *Electrocardiogram.*—Electrocardiograms were obtained in 38 cases of cardiac and coronary insufficiency, 30 minutes after they had received intravenous injections of 1-(β-hydroxypropyl)-theobromine. In no instance was there recorded any immediate (direct) effect on the excitation response.

(4) *Diuresis.*—The diuretic effect of 1-(β-hydroxypropyl)-theobromine was evaluated by means of the concentration and dilution test described by Volhard. 12 subjects having cardiac disease, but without decompensation, were utilized in the determinations. In 10 cases, the 24-hour urine collection following administration of 1-(β-hydroxypropyl)-theobromine was increased by from 200–700 cc. over the control collection. The maximum effect was observed to occur within the first 2 hours after drug administration.

(5) *Serum nitrogen.*—The serum nitrogen values were photometrically determined according to the Kjeldahl technique, as modified by Denies, Cleghorn and Jendrassik. 21 persons having normal and slightly elevated serum nitrogen were administered 0.3 or 0.6 g. 1-(β-hydroxypropyl)-theobromine intravenously. Serum nitrogen determinations following theobromine injection were lowered in each instance from 4–27 mg. percent.

When instead of the 1-(β-hydroxypropyl)-theobromine either hydroxy-ethyl theophylline or theophylline-diethanolamine were employed, no such effect on the serum nitrogen value could be observed. The lowering of the serum nitrogen was observed to be entirely independent of the diuresis produced.

In connection with the above clinical tests, the injection solutions were 40% aqueous solutions of 1-(β-hydroxypropyl)-theobromine. Injection ampoules containing such solution were prepared so that 1 cc. of injection solution contained 0.3 g. of 1-(β-hydroxypropyl)-theobromine.

I claim:

Process for the preparation of 1-(β-hydroxypropyl)-theobromine, which comprises contacting 1-allyl-theobromine with water in the presence of a water-addition catalyst which is a member selected from the group consisting of phosphoric acid, sulfuric acid and boron trifluoride, and recoving from the reaction mixture the 1-(β-hydroxypropyl)-theobromine formed by addition of water to the double bond of the allyl group of said 1-allyl-theobromine.

References Cited in the file of this patent

UNITED STATES PATENTS

| | | |
|---|---|---|
| 2,575,344 | Jones et al. | Nov. 21, 1951 |
| 2,729,642 | Burgison | Jan. 3, 1956 |
| 2,739,921 | Bennett | Mar. 27, 1956 |

OTHER REFERENCES

Rojahn et al.: Arch. Phar., vol. 268, pages 567–572 (1930).

Goodwin et al.: The Pharmaceutical Journal, vol. 181: 4952, pages 233–235, September 1958.

Laurence et al.: British Med. Journal, pages 700–702 (1958).

British Med. Jour., pages 938–939, April 19, 1958.

Keele: The Lancet, pages 243–246, January 31, 1959.